Figure 2:
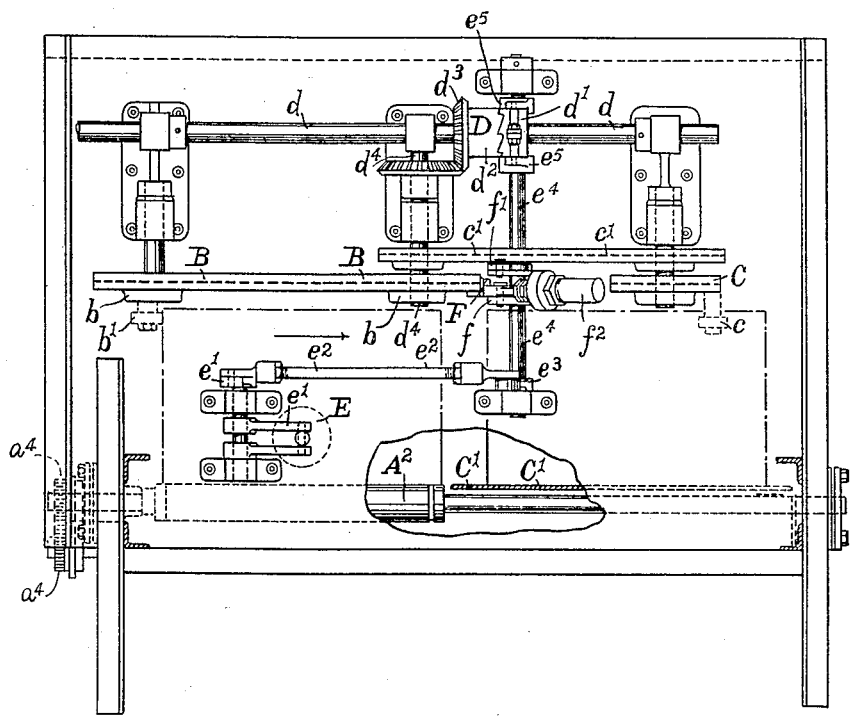

March 8, 1932.  A. G. ENOCK  1,848,609
CONVEYING APPARATUS
Filed March 19, 1930  3 Sheets-Sheet 1
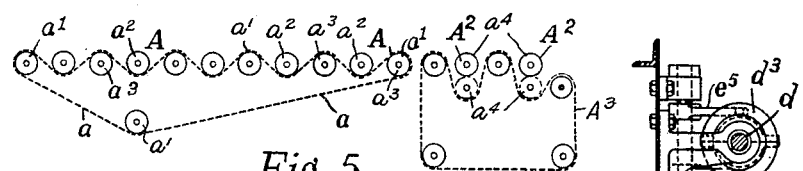
Fig. 5.
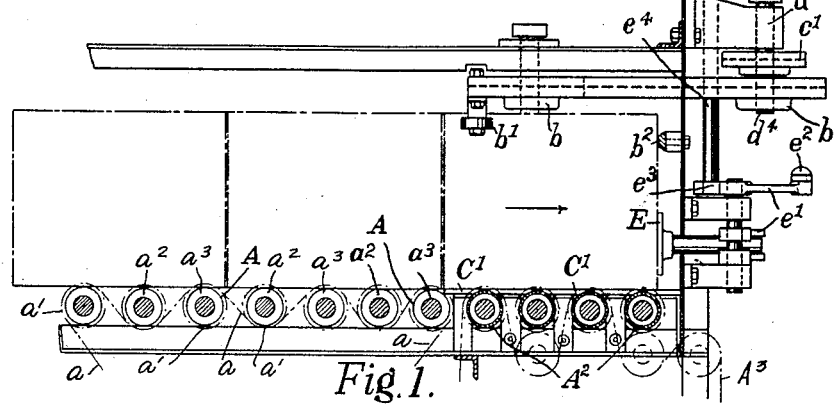
Fig. 1.
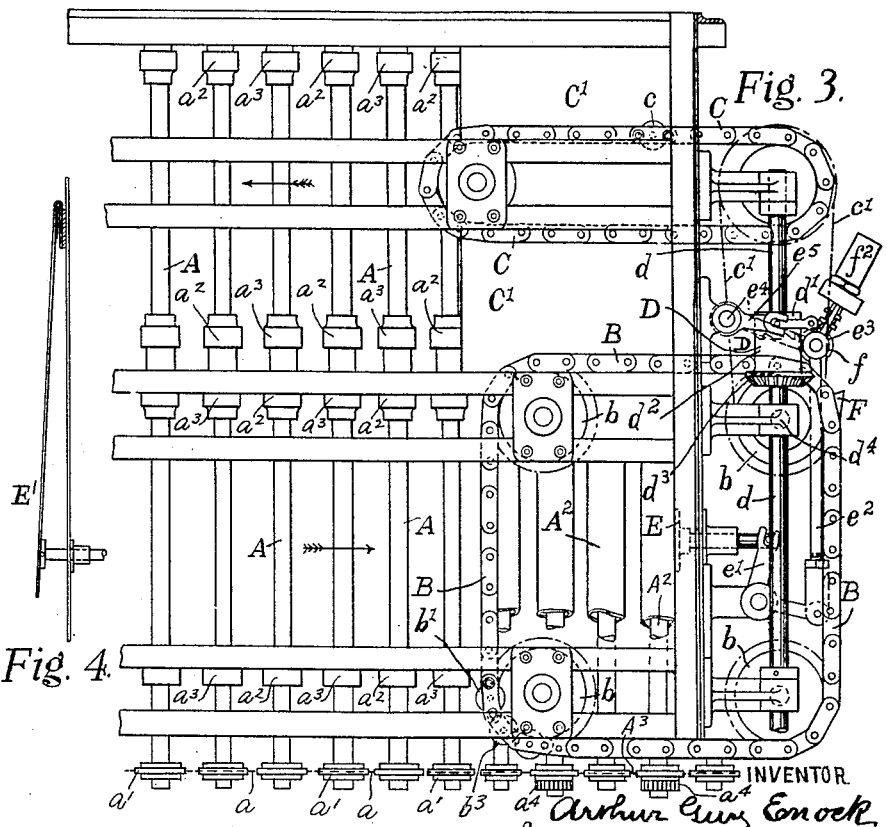
Fig. 3.
Fig. 4.
INVENTOR
Arthur Guy Enock
by J. Owden O'Brien
Attr.

March 8, 1932.    A. G. ENOCK    1,848,609
CONVEYING APPARATUS
Filed March 19, 1930    3 Sheets-Sheet 3
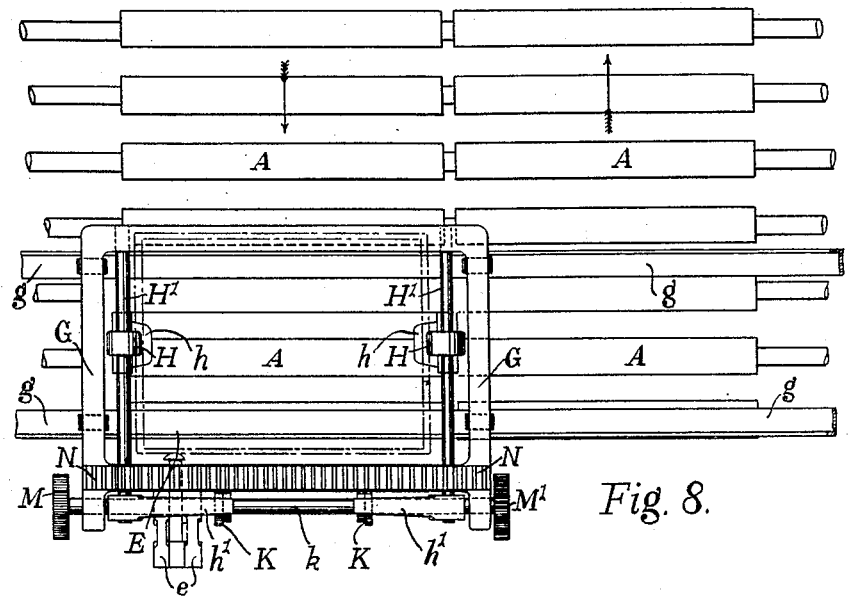
Fig. 8.
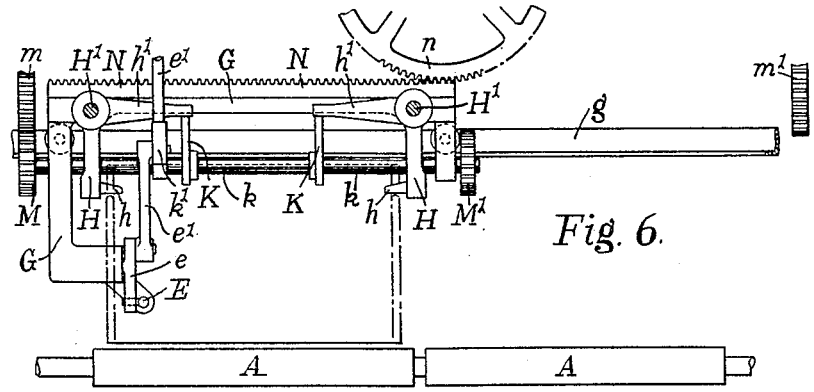
Fig. 6.
Fig. 7
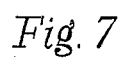
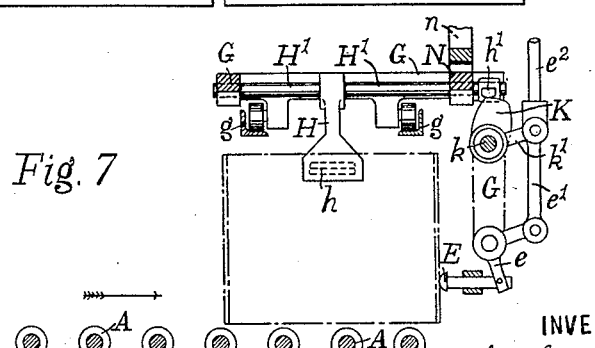
INVENTOR
Arthur Guy Enock
by Towsen O'Brien
Atty.

Patented Mar. 8, 1932

1,848,609

UNITED STATES PATENT OFFICE

ARTHUR GUY ENOCK, OF WEMBLEY PARK, ENGLAND, ASSIGNOR TO BURLECTAS LIMITED, OF LONDON, ENGLAND

CONVEYING APPARATUS

Application filed March 19, 1930, Serial No. 437,180, and in Great Britain April 2, 1929.

This invention relates to conveyor apparatus more particularly applicable for moving or handling crates of bottles in a continuous stream by transferring them from one line of conveyor to another on the same or on different levels where space will not permit of a number of operations being carried out by one long line of conveyors.

The object of the invention is to provide transfer or cross over mechanism whereby the crates in succession can be moved at an angle from one line of conveyor to another and which will continue to function uninterruptedly in a forward direction even when the crates or containers have been arrested or prevented continuing their forward travel.

The apparatus comprises a series of rotating rollers to receive the crates, a second series of rollers (either parallel to or at an inclination to the first) a transverse conveyor chain or lifting mechanism to transfer the crate from one set of rollers to the other, a second conveyor chain to re-start the crates and mechanism to be engaged by each crate in succession, by which the transfer and re-starting mechanism is set in motion.

The invention will be fully described with reference to the accompanying drawings:—

Fig. 1 is a side elevation partly in section.
Fig. 2 is an end elevation.
Fig. 3 is a plan.
Fig. 4 is a modified form of push plate.
Fig. 5 is a diagram of roller drive.
Fig. 6 is a side elevation (part in section) of modified construction.
Fig. 7 is an end elevation partly in section.
Fig. 8 is a plan.

The apparatus is constructed with two sets of roller conveyors in parallel lines in which the rollers comprise shafts or spindles $A$ driven from one end by a chain $a$ passing round sprocket wheels $a^1$ at either end and driving each alternate spindle $A$ in the reverse direction (see Fig. 5) by passing over the top of one spindle $A$ and under adjacent spindles. The spindles are fitted with fixed collars $a^2$ and loose collars $a^3$ to engage the crates. The fixed collars $a^2$ on one end of one spindle $A$ alternate with the loose collars $a^3$ on the same end of adjacent spindles and the loose collars $a^3$ on the other end similarly alternate with the fixed collars $a^2$ on the same ends of adjacent spindles. The alternating of the fixed and loose collars in each set is so that the two sets of rollers will carry the crates in reverse directions as indicated by arrows. The rollers instead of being in parallel sets may be so set as to direct or convey the crates in any desired direction either in the same level or to different levels in which case the rollers of each set may be independently driven.

A transverse or cross over mechanism is fitted at one end of the apparatus to transfer the crates from the first set of conveyor rollers to the second set.

In the form shown in Figs. 1 to 4 a conveyor band or chain $B$ is mounted on sprocket wheels $b$ at a level above the crates to which an intermittent motion is given to move each crate in succession across from one set of conveyor rollers to the other set. A second conveyor band or chain $C$ above the second set of conveyor rollers re-starts the crates in the reverse direction. A dead plate $C^1$ on a level with the second set of rollers receives each crate as it is transferred. The conveyor chain $B$ carries a depending roller $b^1$ which engages the top edge of the crate and the conveyor chain $C$ a corresponding roller $c$. The conveyor chains $B$ and $C$ are driven by a clutch $D$ on the continuously rotating shaft $d$ the clutch member $d^1$ being slidable on a key on the shaft $d$ and rotates with it and the other clutch member $d^2$ and bevel wheel $d^3$ loose on the shaft. The bevel gears drive the shaft $d^4$ and the conveyor chains $B$ and $C$, the latter through a driving chain $c^1$. Thus when the clutch members are in engagement the two conveyor chains are in motion. The two rollers $b$ and $c$ respectively on the chains $B$ and $C$ are so set relatively to one another than when the roller $b$ has moved a crate across, the roller $c$ engages it and restarts it in the other direction. The clutch member $d^1$ is thrown into gear by the action or movement of a push plate $E$ (or $E^1$ Fig. 4) against which each crate comes into contact at the end of its traverse and forces or pushes it back. The push plate $E$ connects with the clutch member $d^1$ through a bell crank lever $e^1$ a connecting rod $e^2$, a lever $e^3$ on the vertical shaft $e^4$ to which it imparts a partially rotary movement and a forked lever $e^5$ on the shaft $e^4$, which is in engagement with the clutch member $d^1$.

To disengage the clutch D and release the push plate E an incline or ram F is bolted to the chain conveyor B which engages a lever $f$ on the shaft $e^4$ rotating the latter in the reverse direction to the lever $e^3$ thereby disengaging the clutch and stopping the mechanism and conveyor chains B and C.

The lever $f$ is loose on the shaft $e^4$ and a corresponding lever $f^1$ is fast upon it the two levers $f$ and $f^1$ being coupled respectively to the plunger and housing of a spring buffer $f^2$ to move synchronously. Should a jam of crates occur and a crate remain pressed against the press plate E preventing the reverse rotation of the shaft $e^4$ and causing the clutch D to remain engaged, the action of the incline or ram F on the lever $f$ is to move the plunger and compress the spring of the buffer $f^2$ without moving the lever $f^1$.

A guide rail $b^2$ serves as a guide for the crate to retain the crate square in position while sliding across and additional rollers $b^3$ on the chain B behind the roller $b^1$ assist in guiding the crate.

The rollers $A^2$ may be driven separately by a chain $A^3$ and at a higher speed than the rollers A (as shown in Fig. 5) to carry the crate forward clear of the next following crate to allow of the free transverse movement of the crate. All the rollers $A^2$ are driven in the same direction, gear wheels $a^4$, rotated by the chain $A^3$, being provided to gear with alternate rollers for this purpose.

In the form shown in Figs. 6 to 8 a carriage G is mounted on rails $g$ at a level above the crates to which an intermittent to and fro movement is given to raise the crates and transfer each in succession across from one set of conveyor rollers to the other set which are constantly rotating in a reverse direction. The carriage G carries two rocking arms H with lugs $h$ adapted to enter the hand holes of the crates. The arms H are keyed on shafts $H^1$ to which are also keyed two levers $h^1$ by which the arms H are rocked by cams K on a shaft $k$ at right angles to the shafts $H^1$ bringing the lugs $h$ into the hand holes in the crate and by reason of the inclined shape of the lugs slightly raising the crate off the rollers. The cam shaft $k$ is connected to a push plate E by a bell crank lever $e$ connecting rod $e^1$ and lever $k^1$ by which a partial rotation is given to the cams K and cam shaft $k$ by each crate as it comes into contact with the push plate E. The connecting rod $e^1$ also raises the rod $e^2$ to engage a clutch mechanism (not shown) similar to that described with reference to Figs. 1 to 4. The cam shaft also carries a gear wheel M at one end and a gear wheel $M^1$ at the other end which mesh alternately with the gear wheels $m$ and $m^1$ which are rotated in opposite directions when the clutch mechanism is thrown into gear. A rack N is affixed to the carriage G with which a rack wheel $n$ engages and by which the carriage carrying the crate is moved across from one side to the other.

In operation the crate contacts with the push plate E rocks the bell crank $e$ raises the connecting rods $e^1$ and $e^2$, rocks the cam shaft $k$ and by the cam K bring the arms H into position in the hand holes of the crate. At the same time the rod $e^2$ engages the clutch mechanism and sets in motion the gear wheels $m$, rack wheel $n$ and gear wheel $m^1$. The gear wheel $m$ meshing with wheel N further rotates the cam shaft $k$ and cams K raising the crate to a higher level and the rack wheel $n$ traverses the carriage G across until the wheel $M^1$ engages the wheel $m^1$ which rotating in the opposite direction rotates the cam shaft and cams K to lower the crate and withdraw the arms H therefrom at the same time permitting the return of the push plate E and disengaging the clutch mechanism. The carriage G is returned to lift another crate by a weight or spring or other suitable reversing motion not shown.

The crates by this crossover mechanism may be conveyed from one line of conveyors to another line of conveyors either horizontal, inclined upwards or inclined downwards or from one chamber to another as required in British specification No. 270882, dated May 19, 1926, or from one machine to another such as washing, filling, capping machines.

Although the present invention is primarily intended for handling crates or containers or bottles, it is not confined to those articles but can be applied for conveying other objects and packages of any character, from one line of conveyors to another at any angle thereto.

It may be applied to any conveying purposes and it has the great advantage that the load on the conveyors is constantly on the move so that intermittent stopping and starting of the load with its extra strains is obviated while at the same time the intermittent motion at the crossovers is provided for without the need for synchronized motions throughout and without danger from jamming.

This invention enables one part of the surface of a conveyor to be moved at a different speed from other parts so that the objects travelled may move towards or away from each other or may be caused to travel close together or to push each other in a predetermined manner.

What I claim as my invention and desire to protect by Letters Patent is:—

1. Conveyor apparatus to transfer crates or other articles from one line of conveyor to another comprising conveying spindles, mechanism for driving alternate spindles in the reverse direction, fast and loose collars on the spindles to allow alternate collars to be rotated in the reverse direction to the spindle, a transverse conveyor chain, a second conveyor chain to restart the crates and mechanism to be engaged by each crate in succession by which the transverse and restarting mechanism is set in motion.

2. Conveyor apparatus to transfer crates or other articles from one line of conveyor to another comprising conveying spindles, mechanism for driving each alternate spindle in the reverse direction, fast and loose collars on the spindles to allow alternate collars to be rotated in the reverse direction to the spindle, a transverse conveyor chain, a second conveyor chain to restart the crates on the second line of conveyor, and a push plate with which the crate engages to set in motion the transverse mechanism.

3. Conveyor apparatus to transfer crates or other articles from one line of conveyor to another comprising conveying spindles, mechanism for driving each alternate spindle in the reverse direction, fast and loose collars on the spindles to allow alternate collars to be rotated in the reverse direction to the spindle, a dead plate to receive the crate from the first line of conveyor a transverse conveyor chain, a second conveyor chain to restart the crates, and a push plate with which the crate engages to set in motion the transverse mechanism.

4. Conveyor apparatus to transfer crates or other articles from one line of conveyor to another comprising conveying spindles, mechanism for driving each alternate spindle in the reverse direction, fast and loose collars on the spindles to allow alternate collars to be rotated in the reverse direction to the spindle, a dead plate to receive the crate from the first line of conveyor, a transverse conveyor chain, and a second conveyor to restart the crates on the second line of conveyor, clutch mechanism to intermittently operate the transverse conveyor, a push plate with which the crates engage in succession and levers and rods connected therewith by which the clutch members are thrown into and out of engagement.

5. Conveyor apparatus to transfer crates or other articles from one line of conveyor to another comprising conveying spindles, mechanism for driving each alternate spindle in the reverse direction, fast and loose collars on the spindles to allow alternate collars to be rotated in the reverse direction to the spindle, a dead plate to receive the crate from the first line of conveyor, a transverse conveyor chain and a second conveyor to restart the crates on the second line of conveyor, clutch mechanism to intermittently operate the transverse conveyor, a push plate with which the crates engage in succession, a bell crank lever and connecting rod moved thereby, a vertical shaft and forked lever by which one clutch member is moved into and out of contact with the other, a ram on the transverse conveyor chain and a lever on the upright shaft with which it periodically engages to throw the clutch member out of engagement.

6. Conveyor apparatus to transfer crates or other articles from one line of conveyor to another comprising conveying spindles, mechanism for driving each alternate spindle in the reverse direction, fast and loose collars on the spindles to allow alternate collars to be rotated in the reverse direction to the spindle, a dead plate to receive the crate from the first line of conveyor, a transverse conveyor chain, and a second conveyor to restart the crates on the second line of conveyor, clutch mechanism to intermittently operate the transverse conveyor, a push plate with which the crates engage in succession, a bell crank lever and connecting rod moved thereby, a vertical shaft and forked lever by which one clutch member is moved into and out of contact with the other, a ram on the transverse conveyor chain and a lever on the upright shaft with which it periodically engages to throw the clutch member out of engagement and a spring buffer to prevent damage to the mechanism should a blockage occur.

In testimony whereof I have hereunto set my hand this 6th day of March, 1930.

ARTHUR GUY ENOCK.